United States Patent
Ebling et al.

(10) Patent No.: US 9,109,928 B2
(45) Date of Patent: Aug. 18, 2015

(54) METHODS AND APPARATUS FOR EFFICIENT AND ADAPTIVE TRANSMISSION OF DATA IN DATA COLLECTION NETWORKS

(75) Inventors: Maria Rene Ebling, White Plains, NY (US); William Francis Jerome, Baldwin Place, NY (US); Archan Misra, Bridgewater, NJ (US); Iqbal I. Mohomed, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 11/839,795

(22) Filed: Aug. 16, 2007

(65) Prior Publication Data

US 2009/0046739 A1 Feb. 19, 2009

(51) Int. Cl.
*H04J 3/18* (2006.01)
*G01D 21/00* (2006.01)
*H04W 24/00* (2009.01)
*H04W 28/06* (2009.01)
*H04W 28/18* (2009.01)
*H04W 52/02* (2009.01)

(52) U.S. Cl.
CPC ............... *G01D 21/00* (2013.01); *H04W 24/00* (2013.01); *H04W 28/06* (2013.01); *H04W 28/18* (2013.01); *H04W 52/0216* (2013.01); *H04W 52/0219* (2013.01)

(58) Field of Classification Search
USPC ................................ 370/477, 465; 455/452.2
See application file for complete search history.

(56) References Cited

U.S. PATENT DOCUMENTS

| | | | |
|---|---|---|---|
| 5,793,416 A * | 8/1998 | Rostoker et al. | 348/14.13 |
| 6,922,444 B1 * | 7/2005 | Cai et al. | 375/260 |
| 6,947,397 B2 * | 9/2005 | Kim et al. | 370/329 |
| 2004/0039836 A1* | 2/2004 | Wee et al. | 709/231 |
| 2004/0148292 A1* | 7/2004 | Clemens | 707/100 |
| 2004/0193399 A1* | 9/2004 | Potter et al. | 704/4 |
| 2005/0021621 A1* | 1/2005 | Welch et al. | 709/204 |
| 2005/0192943 A1* | 9/2005 | Siddiqui et al. | 707/3 |
| 2007/0030179 A1* | 2/2007 | Abdat | 341/50 |
| 2007/0294360 A1* | 12/2007 | Ebling et al. | 709/208 |

FOREIGN PATENT DOCUMENTS

| | | | | |
|---|---|---|---|---|
| EP | 39191 A2 * | 11/1981 | | H04L 1/00 |
| WO | WO 9518500 A1 * | 7/1995 | | H04L 29/06 |

* cited by examiner

*Primary Examiner* — Marcos Batista
(74) *Attorney, Agent, or Firm* — Preston J. Young; Ryan, Mason & Lewis, LLP

(57) ABSTRACT

Methods and apparatus of adaptively transmitting data are provided. Data for transmission from one or more incoming data streams is determined in accordance with at least one characteristic of a respective one of the one or more data streams and at least one context external of the data stream. A compression technique for the data and a transmission strategy for the data are modified in accordance with the data determined for transmission.

22 Claims, 3 Drawing Sheets

METHODS AND APPARATUS FOR EFFICIENT AND ADAPTIVE TRANSMISSION OF DATA IN DATA COLLECTION NETWORKS

FIELD OF THE INVENTION

The present invention relates to the efficient transmission of data and, more particularly, the efficient transmission of data over intermittent connections.

BACKGROUND OF THE INVENTION

Many new computing applications involve the generation and transmission of data from a group of sensor devices to a remote sink node, such as, for example a pervasive device, where such data is aggregated and analyzed. Such applications are becoming common in a variety of remote monitoring scenarios, such as healthcare, where wearable sensors record and transmit various biometric measures of an individual, vehicular telematics, where on-board sensors measure various vehicular parameters and transmit them back to a central diagnostic server, and intelligent transportation systems, where highway sensors periodically record traffic conditions.

Such data gathering systems have important goals or concerns. First, as many of these sensor devices are resource-constrained themselves, typically operating on batteries, the system should minimize the communication and/or the data collection overhead, helping to reduce the energy expenditure of such devices. Second, many of these devices are not just reporting nodes, but also possess a fair degree of processing power and local intelligence. Architecturally, such data collection systems comprise a set of client sensor devices that are connected, often using a wireless communications infrastructure, to the pervasive device, wherein this pervasive device is a part of an existing information technology infrastructure.

A pervasive device and a backend server may have an intermittent connection and multiple interfaces, each with different energy consumption profile and cost, such as, for example 802.11, GPRS and bluetooth. Each interface also exhibits a different temporal variation in connectivity due to the mobility of the user, which may include, for example, the chosen provider, the link rate, and the transmission power needed. Thus, the most effective method of transmitting the data between a pervasive device and a back end server involves answering the questions: how much data, what data and when to transmit?

One simple form of improving the efficiency of the data gathering system is to compress the sensor data prior to transmission. Another important technique for improving the efficiency of the data transmission is to perform data filtering. Data filtering refers to the idea that much of the data may be eliminated or reduced if it is not necessary to the end goals of the infrastructure. There are a wide variety of compression schemes available, such as Huffman, Vector Quantization (VQ), Lempel-Ziv (LZ) and run-length coding. In general, different compression algorithms are applicable to specific types of data sources. Different data sources possess different "statistical parameters" and different algorithms work better for different families of statistics. In addition, the choice of a compression algorithm is also determined by the application's requirement on the quality of the compression.

Another form of known technique for conserving data is to simply use the best connected interface at any given instant, or use data striping to concurrently transmit subsets of data across multiple physical or logical interfaces. However, the big drawback of this solution is that it fails to account for the predictive behavior in network connectivity often exhibited by individuals. More specifically, the pervasive device may consider the probabilities associated without considering connection qualities at future time instants. However, one additional possibility is to have the device consider the probabilities associated with the connection quality on its different interfaces at future time constraints. Thus, if the pervasive device knew that it would almost surely be in contact with a "free" 802.11 WLAN in 1 hour, it might choose to cache its data locally for the upcoming hour, rather than instantaneously relaying it via the currently available GPRS interface, which may have associated "data charges".

One area closely related to transmissions scheduling is "Delay Tolerant Networks" (DTN), where individual devices have significantly large periods of network disconnection, and where the data is typically relayed to the backend server in a multi-hop fashion using a variety of probabilistic relaying techniques. DTN protocols do exhibit the behavior of using likelihoods of future connectivity in determining whether a packet is to be stored locally or forwarded to another pervasive device, which has its own likelihood of being connected to the backend infrastructure. However, these protocols are typically designed for groups of nodes, rather than for the relaying of data from multiple correlated streams by a single node. In particular, these protocols do not factor in the likelihood of data generation by the associated sensors, principally because DTN environments typically have no predictability or knowledge of the data generation patterns.

It would be desirable for the system to allow the sensor devices or any relaying device the capability to dynamically modify the compression technique and transmission strategy and schedule, especially when multiple interfaces are present, over one or more raw or filtered data stream.

SUMMARY OF THE INVENTION

In accordance with the aforementioned and other objectives, the embodiments of the present invention are directed towards methods and apparatus that combine the incoming data and external context to dynamically modify the amount of data, the type of data and the transmission schedule of the data transmission.

For example, in one aspect of the present invention, techniques for adaptively transmitting data are provided. Data for transmission from one or more incoming data streams is determined in accordance with at least one characteristic of a respective one of the one or more data streams and at least one context external of the data stream. A compression technique for the data and a transmission strategy for the data are modified in accordance with the data determined for transmission.

In additional embodiments of the present invention, the data for transmission is compressed in accordance with the compression technique, and the data for transmission is cached or transmitted in accordance with the transmission strategy.

The pervasive device often has knowledge of both the future connectivity profiles and data generation/arrival patterns, as well as knowledge of the priority of the generated data, and can then efficiently schedule the transmission vs caching decision on the data, as well as the volume and type of data to be transmitted, based on this information while considering multiple interfaces.

These and other objects, features and advantages of the present invention will become apparent from the following

DETAILED DESCRIPTION OF PREFERRED EMBODIMENTS

As will be described in detail below, the embodiments of the present invention introduce techniques for combining incoming data and external context to dynamically modify the amount of data, the type of data and the transmission schedule of the data transmission.

It is to be understood that while the present invention will be described below in the context of a healthcare environment, the invention is not so limited. Rather, the invention is more generally applicable to any environment in which it would be desirable to alter the compressed transmission of data generated by a sensor based on changes in external context. As used herein, the term "context" is generally understood to refer to information about the physical or virtual environment of the user and/or sensor devices and communication devices being used by the user.

A specific example of one such application in the field of the present invention is a sensor that reads the pulse of person and relays the data to the pervasive device. The pervasive device performs compression of the data such that it may only send an average reading for the pulse every ten minutes while the person is in an office setting. When the person arrives at a gym, the context information of being at a gym is utilized to change the compression algorithm to send all readings since an application may wish to monitor the pulse more closely (with higher frequency). Likewise, the person may want to make this medical information available to a health care provider. It could be envisioned that more elaborate devices could be utilized, such as ECG or EKG sensors, and the level of compression of data could be altered (or not) based on the context of the person. Context in this situation could be "exercising" and this could be used to drive different compression techniques. Moreover, once the specific set of data elements to be transmitted has been determined, the pervasive device may choose not to transmit the data immediately, since it realizes, based on past history, that the device is very likely to encounter a high-speed 802.11 connection in 30 mins, and its current buffer space is large enough to cache the expected transmission content for 30 mins.

Figure 1:
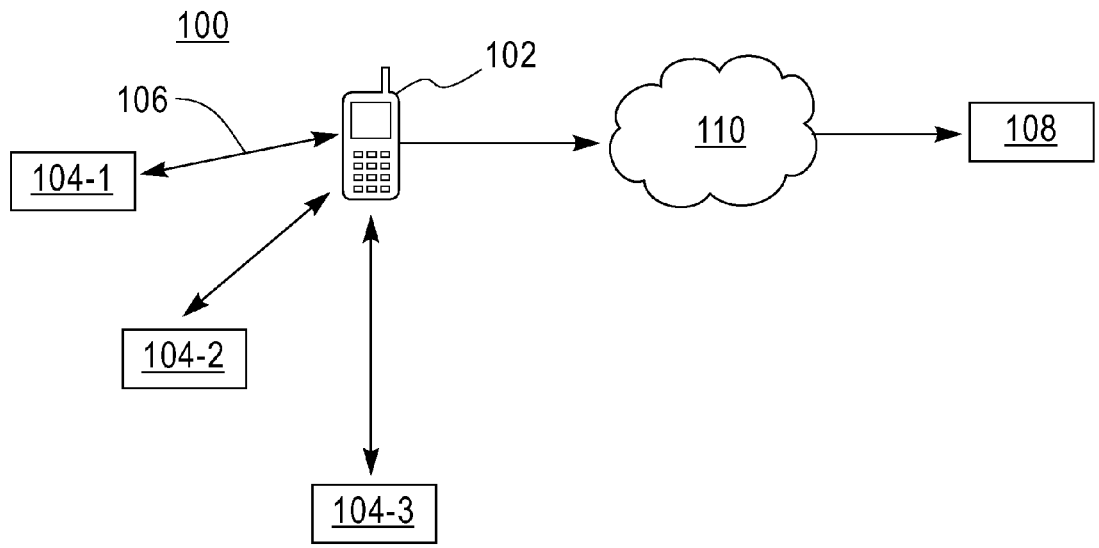
FIG. 1 is a diagram illustrating a data collection system in which localized client device adaptation techniques may be implemented, according to an embodiment of the present invention.

FIG. 1 illustrates a data collection system in which localized client device adaptation techniques may be implemented, according to an embodiment of the present invention. As shown, system 100 includes a pervasive device 102, which is in communication with a plurality of sensors 104-1, 104-2 and 104-3 via short-range wireless links 106 (e.g Bluetooth, Zigbee). The pervasive device of FIG. 1 is shown as a cell phone, however, other types and quantities of gateways may be employed. Further, more or fewer sensors may be employed. Pervasive device 102 is in communication with a remote server 108 through a communication network 110. In accordance with the healthcare scenario, one or more of the sensors can be a health monitor which monitors some health characteristic of the user (wearer), e.g., heart rate, glucose level, etc. It is to be understood that the system can include more clients. However, for simplicity, only one client is shown in FIG. 1.

Figure 2:
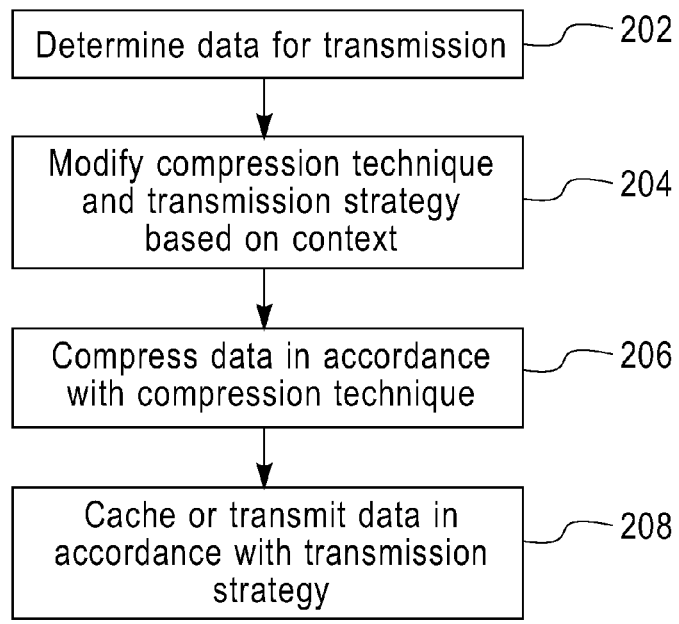
FIG. 2 is a flow diagram illustrating an adaptive data transmission methodology, according to an embodiment of the present invention.

Referring now to FIG. 2, a flow diagram illustrates an adaptive data transmission methodology, according to an embodiment of the present invention. The methodology begins in block 202 where data to be selected for transmission from an incoming data stream is first determined. The determination is performed in accordance with at least one characteristic of the data stream and least one context external of the data stream.

In accordance with the embodiments of the present invention, both the characteristics of the data stream and external context associated with the monitoring of the data stream are used to perform adaptive modification to the transmission of the data by the pervasive device. The characteristics of the data stream may include, for example, its values and any ascribed priority. The external context may include, for example, the applications interested in the data, the ranges of interest to various applications, and the time constraints associated with the data reception at the backend server.

The modification of the data includes the use of the data stream values and the external context to determine what subset or statistic of the data needs to be transmitted back. The data stream values may be used individually or as a sequence of values. The modification of the data further includes the adaptive altering of the compression technique and transmission scheduling logic applied to the data, based on the subset or statistic of the data selected for transmission back to the server.

The context for modifying the statistic or features of data "of interest" to the remote server is used by a rule engine to compute the appropriate modifications to the incoming data stream and generate the resultant outgoing "data event stream." Context in this situation could be coming from the pervasive device or obtained from a remote server. The rule engine would not only compute the outgoing "data event stream" but also the set of meta-data that would subsequently be used to modify the data compression and transmission scheduling components.

Referring again to FIG. 2, in block 204 a compression technique and a transmission strategy for the data are modified based on context.

An embodiment of the present invention allows for dynamic modification of the compression techniques applied to the outgoing "data event stream" based on the adaptive modification to this stream made by the rule engine, even though the characteristics of the incoming data stream may remain unchanged. The set of compression techniques across which the invention would allow the data compression to be switched could either be based on existing well-known compression strategies, such as, for example, Huffman, LZ, and JPEG/DCT, or new compression methodologies.

A technique that uses as input both a connectivity probability vector describing the connectivity attributes of various interfaces at future instants, and a data generation probability vector that describes the likelihoods associated with different data generation rates at future time instants, is used to determine the best transmission strategy. The connectivity attributes may include, for example, cost and speed. The output rates may include, for example, their attributes, such as lost priority and delay tolerance. The technique essentially makes "transmit" vs. "cache" decisions at each instant based on the currently stored output event stream, the amount of residual buffer size, the amount of residual energy, and the future connectivity vector.

Additionally, connectivity probability vectors and data generation vectors could also be computed based on observed patterns of connectivity and data generation behavior exhibited by an individual device, appropriate groups of devices, which are computed by an externally provided function. Utilizing observed patterns could improve accuracy and simplifies the specification of these vectors.

Although a variety of techniques for computing this transmit vs. cache decision are possible, a preferred embodiment of the present invention uses a technique known as finite horizon decision tree to determine the best expected course of action at present, which may include decisions to partially or completely transmit the currently stored/arriving data on a particular interface, partially or completely cache the data at present or partially or completely discard the arriving data. The finite horizon decision tree technique essentially uses the probability vectors to determine the most optimal steps at a finite number of future instants by constructing a tree of possible outcomes up to a finite depth D and then backtracking to determine the least cost feasible path, while taking into account the constraints on storage resources on the pervasive device, as well as the different costs and link qualities on the various network interfaces.

Accordingly, in block 206 of FIG. 2, the data is compressed in accordance with the compression technique. In block 208, the data is cached or transmitted in accordance with the transmission strategy, terminating the methodology.

The embodiments of the present invention permit the device to more intelligently optimize its data transmission, in effect using prediction of the future to reduce some metric of interest, such as, for example, the cost of transmission, measured in dollars/bit, or the energy consumed in transmission. Such savings can become especially significant when the data streams themselves have high data rates, as would be the case for rich sensor data, which may include, for example, audio, video or high data rate biomedical sensor streams.

The present invention provides for the joint adaptation of both the transmission schedule and the compression technique used on the data. While each of these may be done independently, the embodiments of the present invention propose that the two decisions may be made in a coupled fashion. For example, by knowing the connectivity probability vector, a phone may choose to compute what data generation probability vector would be adequate to ensure that the probability of data being lost due to buffer overflow on the mobile device lies below a context-dependent threshold. The appropriate class of compression algorithm, or appropriate parameters thereof, is then chosen to ensure that the "compressed data stream" has an expected data rate that lies close to, but below the computed "data generation probability vector".

Figure 3:
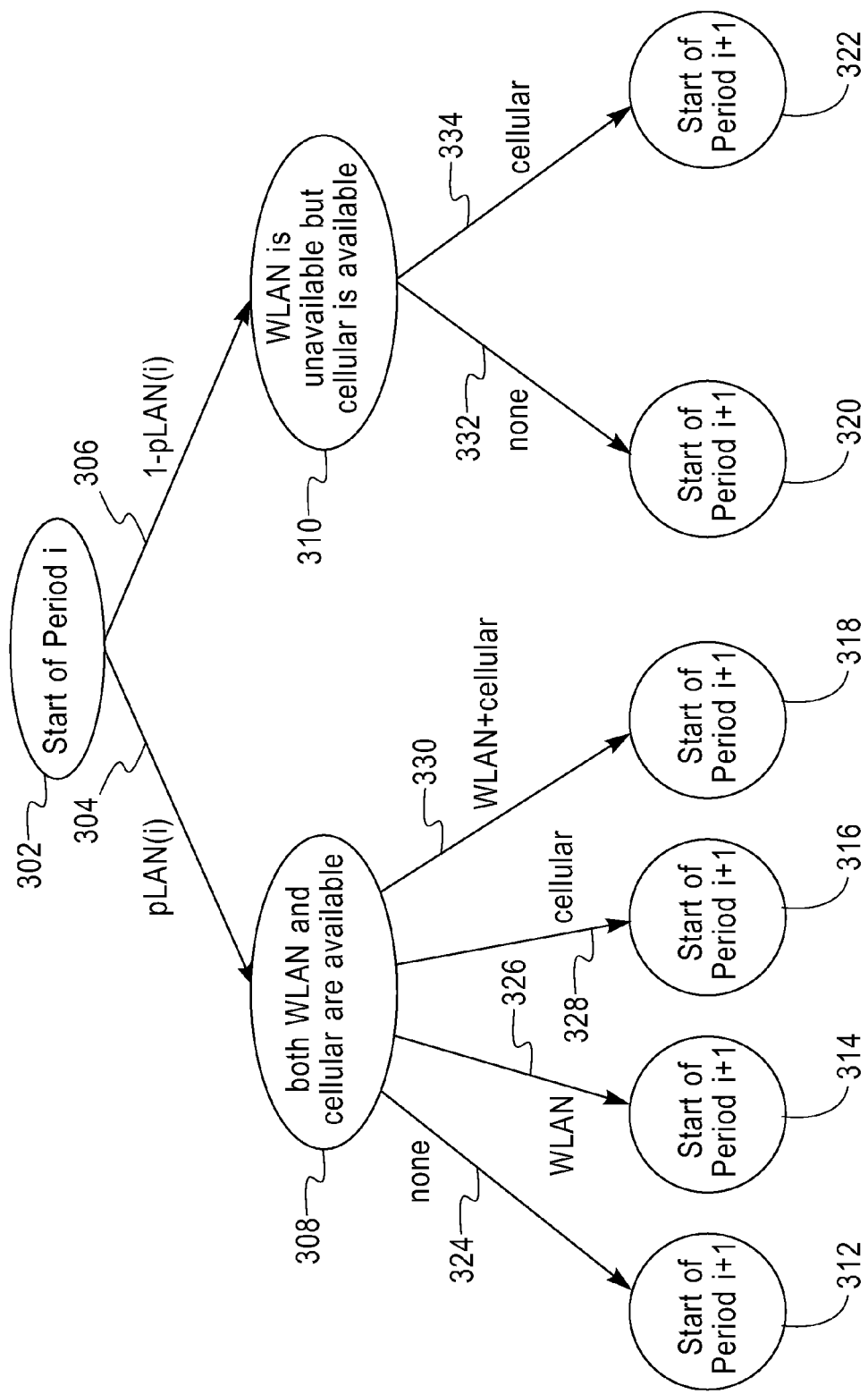
FIG. 3 is a diagram illustrating steps by which one level of the finite horizon decision tree is constructed to make 'cache' vs 'transmit' decisions in the presence of potentially multiple interfaces, according to an embodiment of the present invention.

Referring now to FIG. 3, a diagram illustrates the basic technique for the finite horizon decision tree algorithm, according to an embodiment of the present invention. In this approach, time is considered to be slotted, with each slot defining a future time interval. This approach operates by defining a tree structure, where the nodes at a particular level denote the corresponding future time slot, and the child nodes of such a node denote the various possible transmission vs. caching strategies, based on the availability of the various interfaces on the transmitting device. In this way, a decision tree can be built, where a path on the tree indicates a particular unique sequence of combination of available interfaces at successive time slots. The term 'finite horizon' is used to indicate that while the tree may have infinite depth in theory, in practice, the tree is computed only up to a finite number (D) of future time slots. By then using a) the predicted probability of data generation rates at each such future time slot and the probabilities of various combinations of interface availability in the corresponding time slot, and b) the known size of the data currently stored in the device's cache (at the beginning of the current slot), the approach can build up the expected size of the cache and the corresponding total usage cost incurred for each sequence of transmission strategies. One can then choose the optimal strategy for the current time slot (based on a lookahead up to D future time slots) as the one corresponding to the path that minimizes the expected cost, while ensuring that the bound on the finite capacity of the cache is not violated at any of the D+1 (including the current) time slots.

FIG. 3 shows a partial view of the decision tree, corresponding to the case where there are two interfaces (cellular and wireless LAN (802.11)) on the transmitting device. Moreover, it is assumed that the cellular interface is always connected (available with probability 1) while the wireless LAN interface has a probability pLAN(i) of being available in the next time slot i. Let ED(i) be the amount of sensor data that is expected to come into the mobile device in period i, M be the maximum capacity of the transmitting device's cache, and let B(i) be the amount of sensor data stored in the mobile device's memory buffer at the start of period i. Also, let rate(cellular) and rate(WLAN) represent the amount of data that can be transmitted by using the corresponding interface over a single time slot. Finally, it is assumed that $C_{wifi}(x)$ and $C_{cellular}(x)$ are cost functions for using the WLAN and cellular interfaces, respectively, based on the number of bytes that must be transmitted. These can represent, for example, the actual price paid for transmitting such data, or the transmission energy expended in sending a bit of data on the corresponding interface. For every period that it is desired to look ahead by, the decision tree has two additional levels in height, referred to as stages. FIG. 1 illustrates the two stages in building the tree to lookahead by one level.

Stage 1: In this stage, at a node labeled "start of period i" 302 (where there is a known amount of data B(i)), all the possible combinations of the connection state of the device's interfaces are enumerated. In FIG. 3, where it is assumed that cellular is always connected, there are two possible states: one where 'WLAN is unavailable, but cellular is available' 310, and another where 'both WLAN and cellular are available' 308. The edges from the parent node to these child nodes are labeled with the corresponding probability (1-pLAN(i)) 306 and pLAN(i) 304 of finding the node's interfaces in that state. In general, if a node has k different interfaces, the number of such child nodes would be $2^k$.

Stage 2: The second stage models the system selecting some interfaces to use for data transmission in this period. As mentioned, every child node corresponds to a different combination of available interfaces. If the number of available interfaces at a child node is x, then it will have $2^x$ children, where each of the new children are labeled "start of period i+1" (312, 314, 316, 318 for "both WLAN and cellular are available" and 320, 322 for "WLAN is unavailable, but cellular is available"). Each of the edges between the parent node and the corresponding "start of period i+1" node represents a particular transmission strategy. In this specific case, there are four transmission strategies for the case "both WLAN and cellular are available" 308: do not transmit on either interface 324, transmit only of WLAN 326, transmit only on cellular 328, and transmit on both WLAN and cellular 330. Correspondingly, for the case 'WLAN is unavailable, but cellular is available' 310, there are two legitimate strategies: do not transmit on either interface 332, or transmit only on the cellular interface 334. For any such transmission strategy, the amount of sensor data in the device's memory buffer can be computed using the following equation: $B(i+1)=\max(0, (B(i)+D(i))-TC)$ where TC is the sum of transmission capacity of the wireless interfaces selected by the system. For example, for the strategy "transmit only on the cellular interface" 334, TC=rate(cellular), while for the strategy "transmit on both WLAN and cellular" 330, TC=rate(cellular)+rate (WLAN). If B(i+1) exceeds M, the maximum cache capacity, this node is marked to be 'invalid'.

By proceeding in this way, one can construct the corresponding decision tree up to D future timeslots (the tree will have a depth of 2D). The optimal strategy at the current time slot is then defined by the link that lies on the least cost path through this tree. To compute this least cost path, one start by considering nodes (only those not marked 'invalid') at the lowest level of the tree and moving upwards. At each node where the system has to make a decision, it picks the lowest cost alternative. At nodes where the edges to the children are probabilities, the expected minimum total cost is computed by using the probabilities as the weights. The process continues until the very top of the tree is reached. While the above method of using a decision tree to enumerate and evaluate all future possible outcomes and strategies represents one preferred form of the invention, it should be evident that many alternative forms of selecting a preferred strategy are captured by this invention. For example, the choice of the optimal "cache vs transmit" strategy may also be formulated as a finite horizon dynamic programming problem, or may be based on past analysis of the most likely outcomes and preferred actions taken on past days.

Figure 4:
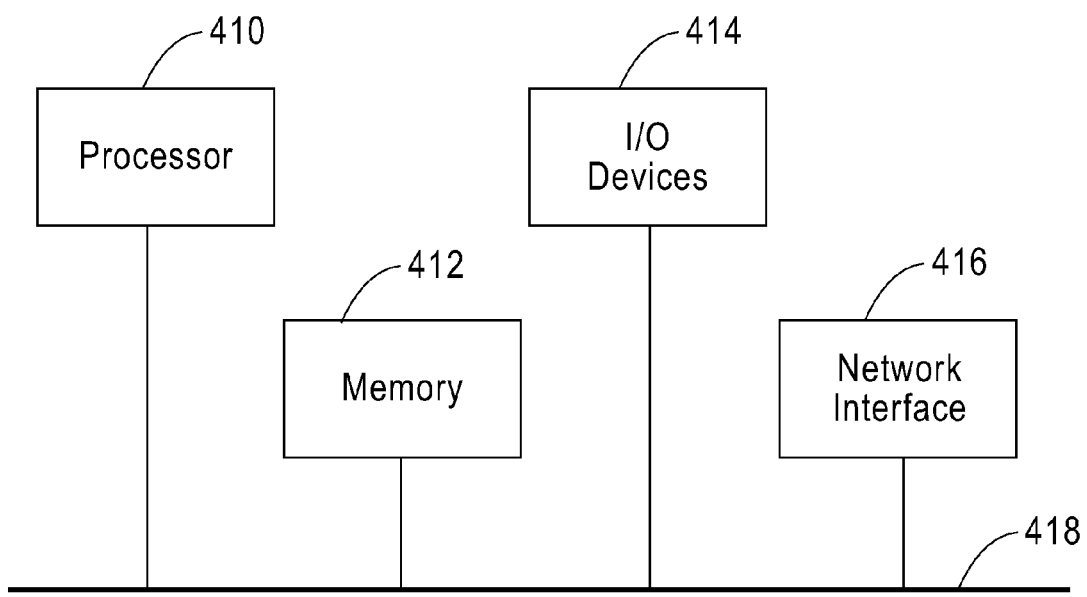
FIG. 4 is a block diagram illustrating an exemplary hardware implementation of a computing system in accordance with which one or more components/methodologies of the invention may be implemented, according to an embodiment of the present invention.

Referring now to FIG. 4, a block diagram illustrates an exemplary hardware implementation of a computing system in accordance with which one or more components/methodologies of the invention (e.g., components/methodologies described in the context of FIGS. 1-3) may be implemented, according to an embodiment of the present invention.

As shown, the computer system may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of adaptively transmitting data comprising the steps of:
    selecting data for transmission, wherein the data for transmission is based on an incoming data stream, and wherein the data is selected in accordance with at least one characteristic of the data stream and at least one context external of the data stream; and
    determining a compression technique applied to the selected data and a transmission strategy applied to the selected data in accordance with the selected data, wherein the transmission strategy comprises a determination of whether to transmit the data on at least a given output interface at a given time;
    wherein the determination of the compression technique and the transmission strategy is based at least in part on at least one predicted data generation behavior for at least one future time and at least one predicted availability of at least the given output interface for the at least one future time; and
    wherein the steps are performed by at least one processor.

2. The method of claim 1, further comprising the step of compressing the data for transmission in accordance with the compression technique.

3. The method of claim 1, further comprising the step of caching or transmitting the data for transmission in accordance with the transmission strategy.

4. The method of claim 1, wherein, in the step of selecting data for transmission, the selected data comprises at least one of a portion of data from the data stream, one or more transformations applied to the data stream, and a statistical summary derived from the data stream.

5. The method of claim 1, wherein, in the step of selecting data for transmission, the at least one context is associated with monitoring the data stream.

6. The method of claim 1, wherein, in the step of selecting data for transmission, the at least one context comprises at least one of applications interested in the data, ranges of interest for applications, and time constraints associated with data reception.

7. The method of claim 1, wherein the step of selecting data for transmission comprises the steps of:
    computing a modification to the data stream through a rule engine to generate the data for transmission; and
    computing meta data used to modify the compression technique and the transmission strategy through the rule engine.

8. The method of claim 7, wherein the compression technique is determined in accordance with the modification to the data stream by the rule engine.

9. The method of claim 1, wherein the step of determining the compression technique and the transmission strategy is in accordance with a connectivity probability vector and a data generation probability vector.

10. The method of claim 9 wherein the step of determining the compression technique and the transmission strategy comprises the step of learning probabilities for attributes of at least one of connectivity and data generation behavior at the at least one future time from past patterns of connectivity and data generation behavior exhibited by one or more devices in accordance with an externally provided function.

11. The method of claim 9, wherein the step of determining the compression technique and the transmission strategy further comprises the step of using the connectivity probability vector and the data generation probability vector to determine the transmission strategy using a finite horizon decision tree formulation, wherein a set of possible outcomes and associated costs are computed to a specified depth and a least cost feasible path is selected.

12. The method of claim 9, wherein the step of determining the compression technique and the transmission strategy accounts for at least one of constraints on storage resources and cost and link qualities.

13. The method of claim 1, wherein the transmission strategy further comprises a decision to transmit or cache the data for transmission.

14. The method of claim 1, wherein the at least one predicted data generation behavior for the at least one future time comprises at least one predicted data generation rate for the given time.

15. The method of claim 1, wherein the given output interface is one of a plurality of output interfaces and wherein the at least one predicted availability for the at least one future time comprises at least one predicted availability for each of the plurality of output interfaces for the at least one future time.

16. Apparatus for adaptively transmitting data, comprising:
a memory; and
at least one processor coupled to the memory and operative to: (i) select data for transmission, wherein the data for transmission is based on an incoming data stream, and wherein the data is selected in accordance with at least one characteristic of the data stream and at least one context external of the data stream; and (ii) determine a compression technique applied to the selected data and a transmission strategy applied to the selected data in accordance with the selected data, wherein the transmission strategy comprises a determination of whether to transmit the data on at least a given output interface at a given time;
wherein the determination of the compression technique and the transmission strategy is based at least in part on at least one predicted data generation behavior for at least one future time and at least one predicted availability of at least the given output interface for the at least one future time.

17. The apparatus of claim 16, wherein the at least one processor is further operative to compress the data for transmission in accordance with the compression technique.

18. The apparatus of claim 16, wherein the at least one processor is further operative to cache or transmit the data for transmission in accordance with the transmission strategy.

19. The apparatus of claim 16, wherein the operation of determining data for transmission comprises the steps of:
computing a modification to the data stream through a rule engine to generate data for transmission; and
computing meta data used to determine the compression technique and the transmission strategy through the rule engine.

20. The apparatus of claim 19, wherein the compression technique is determined in accordance with the modification to the data stream by the rule engine.

21. The apparatus of claim 19, wherein the operation of determining the compression technique and the transmission strategy is in accordance with a connectivity probability vector and a data generation probability vector.

22. A method for making a computer implemented process to enable the adaptive transmission of data, the method comprising the steps of:
instantiating first computer instructions onto a computer readable medium, the first computer instructions configured to select data for transmission, wherein the data for transmission is based on an incoming data stream, and wherein the data is selected in accordance with at least one characteristic of the data stream and at least one context external of the data stream; and
instantiating second computer instructions onto a computer readable medium, the second computer instructions configured to determine a compression technique applied to the selected data and a transmission strategy applied to the selected data in accordance with the selected data, wherein the transmission strategy comprises a determination of whether to transmit the data on at least a given output interface at a given time;
wherein the determination of the compression technique and the transmission strategy is based at least in part on at least one predicted data generation behavior for at least one future time and at least one predicted availability of at least the given output interface for the at least one future time.

* * * * *